United States Patent
Wilson et al.

(10) Patent No.: US 6,434,611 B1
(45) Date of Patent: *Aug. 13, 2002

(54) SYSTEM AND METHOD FOR MESSAGE-BASED REAL-TIME RECONFIGURATION OF A NETWORK BY BROADCASTING AN ACTIVATION SIGNAL TO ACTIVATE A NEW CONNECTION CONFIGURATION

(75) Inventors: Neal Alan Wilson, Plano; Clinton Allen Wagner, Allen, both of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/770,503

(22) Filed: Dec. 20, 1996

(51) Int. Cl.[7] ........................ G06F 15/177; G06F 15/16; G06F 15/173

(52) U.S. Cl. ........................ 709/221; 709/220; 709/223; 709/248

(58) Field of Search ................................. 709/221, 222, 709/248, 223, 224, 220, 238; 370/254, 453, 457

(56) References Cited

U.S. PATENT DOCUMENTS

| | | | | |
|---|---|---|---|---|
| 4,949,299 A | * | 8/1990 | Pickett | 710/105 |
| 4,987,536 A | | 1/1991 | Humblet | |
| 5,175,800 A | * | 12/1992 | Galis et al. | 706/45 |
| 5,353,339 A | * | 10/1994 | Scobee | 379/207 |
| 5,426,674 A | * | 6/1995 | Nemirovsky et al. | 709/241 |
| 5,434,798 A | * | 7/1995 | Madebrink et al. | 709/221 |
| 5,521,972 A | | 5/1996 | Iki | |
| 5,666,293 A | * | 9/1997 | Metz et al. | 709/220 |
| 5,671,357 A | | 9/1997 | Humblet et al. | |
| 5,689,640 A | | 11/1997 | Okanoue | |
| 5,706,431 A | | 1/1998 | Otto | |
| 5,815,649 A | * | 9/1998 | Utter et al. | 714/6 |
| 5,835,784 A | * | 11/1998 | Gillespie et al. | 710/10 |
| 5,848,244 A | * | 12/1998 | Wilson | 709/221 |

* cited by examiner

Primary Examiner—Le Hien Luu
Assistant Examiner—Paul Kang (57) ABSTRACT

A system and method for reconfiguring a telecommunications network comprising a plurality of network elements is disclosed. The reconfiguration process begins by identifying a new configuration for the telecommunications network. Next, the process stores the new configuration with the old configuration for the telecommunications network. The system then identifies new connection information associated with the new configuration. The system then downloads the new connection information to the plurality of network elements. After the connection information has been downloaded, the connection information is stored with the old connection information at the plurality of network elements. Next, a message is broadcast to the plurality of network elements to activate the new configuration and deactivate the old configuration. The activation of the new connection information stored by the plurality of network elements occurs substantially simultaneously.

16 Claims, 5 Drawing Sheets

SYSTEM AND METHOD FOR MESSAGE-BASED REAL-TIME RECONFIGURATION OF A NETWORK BY BROADCASTING AN ACTIVATION SIGNAL TO ACTIVATE A NEW CONNECTION CONFIGURATION

CROSS-REFERENCE TO OTHER APPLICATIONS

The following applications of common assignee contain some common disclosure as the present application:

U.S. Patent Application entitled "System and Method for Time Based Real-Time Reconfiguration of a Network", filed Dec. 20, 1996, U.S. application Ser. No. 08/770,463, now U.S. Pat. No. 5,848,244.

BACKGROUND OF THE INVENTION

1. Field of the Invention

The present invention relates generally to telecommunication network management systems. More specifically, the present invention is directed to high speed network reconfiguration.

2. Related Art

The reconfiguration of a service provider's network is becoming increasingly important. Network complexity continues to grow with the addition of network elements, the implementation of high bandwidth connections, such as OC-12, and the multiplexing and demultiplexing of lower bandwidth connections in and out of higher bandwidth connections. The goal of network reconfiguration is to optimize equipment usage and provide the highest possible quality service to the customer while simultaneously reducing cost.

Unfortunately, the current process of reconfiguring a service provider's network ("patch and roll") is so slow, costly and has such a negative effect on network performance that the network cannot be optimized. Reconfiguration is so slow that the reconfiguration process can not keep up with equipment and circuit changes, let alone provide for management of traffic and customer demand.

Telecommunication service providers (e.g., MCI Telecommunications Corporation) provide a wide range of services to their customers. These services range from the transport of a standard 64 kbit/s voice channel (i.e., DS0 channel) to the transport of higher rate digital data services (e.g., video). Both voice channels and digital data services are transported over the network via a hierarchy of digital signal transport levels. For example, in a conventional digital signal hierarchy 24 DS0 channels are mapped into a DS1 channel. In turn, 28 DS1 channels are mapped into a DS3 channel.

Routing of these DS1 and DS3 channels within a node of the network is performed by digital cross-connect systems. A node is a point of connection into a network. Digital cross-connect systems typically switch the channels at the DS1 and DS3 signal levels. Transmission of channels between nodes is typically provided via fiber-optic transmission systems. Fiber-optic transmission systems can multiplex a plurality of DS3 channels into a higher rate transmission over a single pair of fibers.

Alternatively, a fiber-optic transmission system can implement the synchronous optical network (SONET) standard. The SONET standard defines a synchronous transport signal (STS) frame structure that includes overhead bytes and a synchronous payload envelope (SPE). One or more channels (e.g., DS1 and DS3 channels) can be mapped into an SPE. For example, a single DS3 channel can be mapped into an STS-1 frame. Alternatively, 28 DS1 channels can be mapped into virtual tributaries (VTs) within the STS-1 frame.

Various STS-1 frames can be concatenated to produce higher rate SONET signals. For example, an STS-12 signal includes 12 STS-1 frames, while an STS-48 signal includes 48 STS-1 frames. Finally, after an STS signal is converted from electrical to optical, it is known as an optical carrier (OC) signal (e.g., OC-12 and OC-48).

The end-to-end path of an in-service channel within a network typically traverses a plurality of nodes. The term "in-service channel" is defined as the end to end communication channel that is providing communication service from one customer site or local exchange to another. The process of establishing the in-service channel is called "provisioning." A new channel that has been established but is not yet carrying communications traffic is called a "provisioned channel." The in-service channel is carried over transmission facilities that operate at various rates in the digital signal hierarchy. For example, a provisioned DS1 channel may exist as part of a DS3, VT1.5, STS-1, STS-12, OC-12, and OC-48 signal along parts of the end-to-end path. This results due to the switching, multiplexing and demultiplexing functions at each of the nodes.

"Patch and roll" is the current process of switching an in-service channel from one node to another, thereby changing the nodes traversed by the in-service channel. Patch and roll first establishes a new communications circuit by adding a new node between two existing nodes on the in-service channel, creating a "patch." The new communications circuit is tested to obtain a good signal. After a good signal has been obtained, the in-service channel is switched over to the new circuit and the old connection is broken. In order to maintain communications, patch and roll requires that the old in-service channel be switched over one node at a time.

Reconfiguring the network by patch and roll wastes network capacity. Since patch and roll establishes a parallel connection when switching from one node to another, the network must have additional capacity to create the second connection. Designing additional capacity into the network means additional cost for capacity that will not be providing service to the customer.

The current process for reconfiguring the network is too slow. Patch and roll switches one node over at a time, requiring at least two seconds, and often five seconds, to switch each node. With manual coordination, two nodes may be switched over at once. Since a network may contain upwards of 250,000 DS-1 circuits, the time required to reconfigure the network with patch and roll renders network management nearly impossible.

The current process for network reconfiguration makes management of the network very difficult. Maintenance windows are time periods when the network may be reconfigured. In the Digital Data Network (DDN), there are two six-hour maintenance windows per month. Since patch and roll only allows only (at most) eighteen hundred connections to be switched in an hour, only a very small fraction of the connections in the DDN may be switched each month. Because new circuits are added constantly, network traffic, customer needs and bandwidth demands change constantly, the patch and roll method of network management is unacceptable.

The current process for network reconfiguration results in poor network performance. In patch and roll, it takes at least 50 milliseconds to switch each node in the in-service channel over to the provisioned channel. During this time, the in-service channel will be lost. Since patch and roll switches only one node at a time, switching the in-service channel results in numerous communication drop outs. On voice communication channels (switchnet), multiple 50 millisecond drop outs may result in a lost connection or in intermittent distortion. On the Digital Data Network (DDN), however, the 50 millisecond losses will result in dropped computer connections, data errors or software application crashes. Since many nodes may have to be switched, the patch and roll process may result in a total loss of network functionality to the customer, or greatly reduced performance.

In this environment, comprehensive network connection reconfiguration is difficult to accomplish. What is needed is a telecommunication network management system that can switch a large number of nodes on the in-service channel in a short time. This capability will allow network management to free up network capacity, improve customer service and increase the speed of the network.

SUMMARY OF THE INVENTION

The present invention satisfies the above mentioned needs by providing a method and system for real time reconfiguration of the network that can switch a large number of network nodes in a very short period of time.

The present invention is a message based system and method for reconfiguring a telecommunications network domain comprising a plurality of network elements. The reconfiguration process begins by identifying a new configuration for the telecommunications network. Next, the process stores the new configuration with the old configuration for the telecommunications network. The system then identifies new connection information associated with the new configuration. The system then downloads the new connection information to the plurality of network elements. After the connection information has been downloaded to the network elements, the connection information is stored with the old connection information at the plurality of network elements. Next, a message is broadcast to the plurality of network elements to activate the new configuration and deactivate the old configuration. The activation of the new connection information stored by the plurality of network elements occurs substantially simultaneously.

BRIEF DESCRIPTION OF THE FIGURES

In the drawings, like reference numbers indicate identical or functionally similar elements. Additionally, the left-most digit of a reference number identifies the drawing in which the reference number first appears. The present invention will be described with reference to the accompanying drawings, wherein.

DETAILED DESCRIPTION OF THE PREFERRED EMBODIMENTS

The present invention provides a system and method for reconfiguring a telecommunications network quickly and automatically. The present invention enables a service provider to quickly reconfigure its network at any bandwidth in sub-seconds. The process for reprovisioning an in-service channel requires a hierarchy of network levels and detailed up to date network information. The network information is combined with customer requirement information to generate a new configuration for the network at a network management level. The new configuration describes the connections that must be made and broken at the physical layer of the network to reprovision the in-service channel. The connection information may be in the form of a network map describing the desired network configuration, or in the form of a delta file describing only those connections that have changed (i.e., connections to be made and broken).

The connection information is downloaded from the network management down to the network physical layer, where the connection information is implemented. The old unneeded connections are broken and new connections are made substantially simultaneously, to reprovision a new in-service channel. Connection information is information describing the connections between the nodes in the network. The new in-service channel is provided quickly and with minimum impact to customer service, thereby solving the problems associated with the previous network reconfiguration process.

Figure 1:
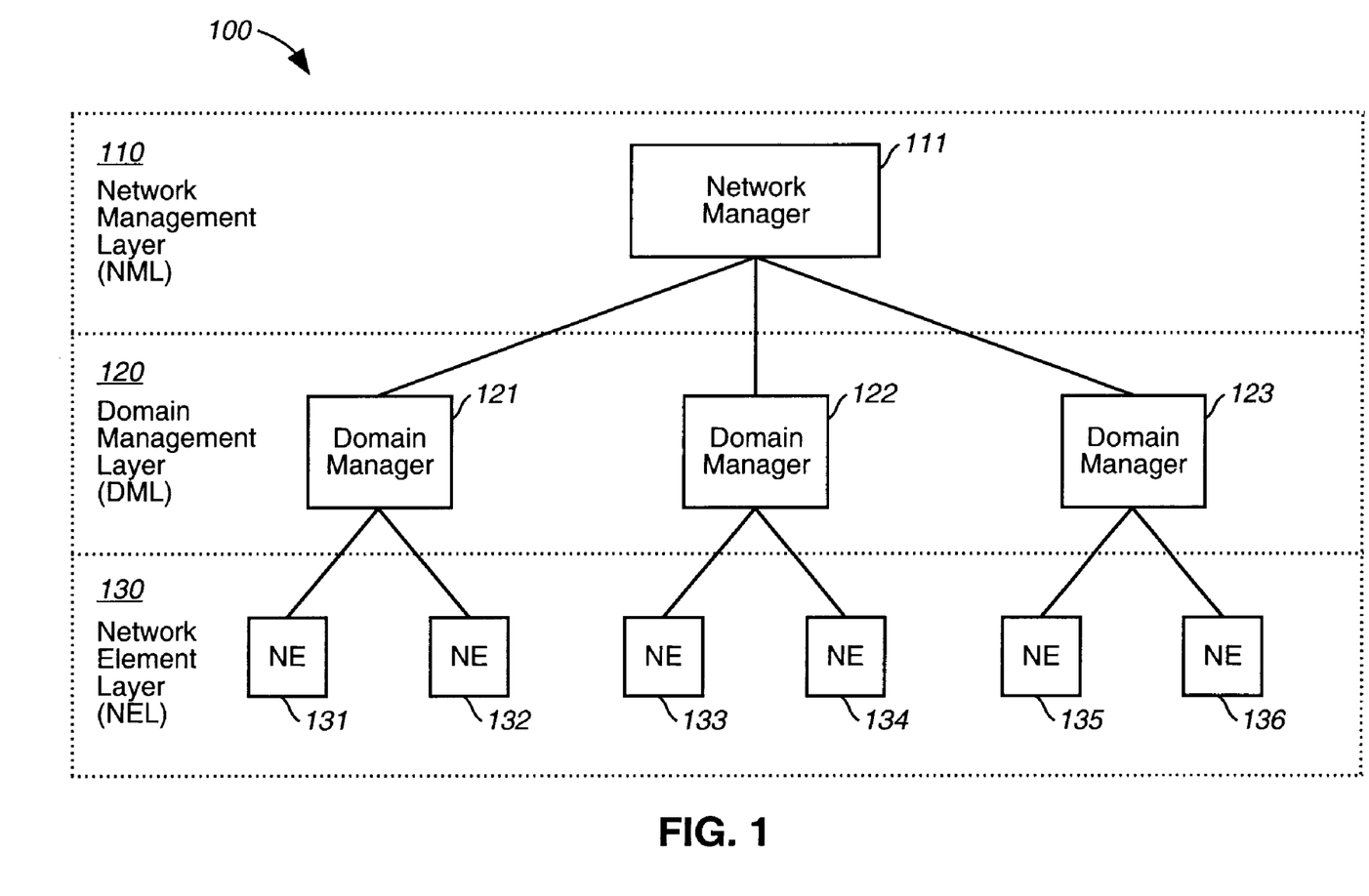
FIG. 1 illustrates the layers in a network management system.

FIG. 1 illustrates a network management system 100 which is the preferred environment of the present invention. Network management system 100 preferably complies with the International Telecommunications Union (ITU) Telecommunications Management Network (TMN) standard. The TMN standard defines a layered framework for a service provider to implement its own network management process.

Network management system 100 comprises three layers 110, 120 and 130. Layer 130 is designated as the network element layer (NEL). NEL 130 is a physical layer that includes the various network systems (e.g., asynchronous systems, SONET systems, etc.) used in the transport and routing of network traffic (e.g., DS1, DS3, OC-N, etc.). NEL 130 comprises network elements 131–136. Examples of network elements are wideband digital cross connects (WBDXC), broadband digital cross connects (BBDXC), optical cross connects, lightwave terminating elements (LTEs), etc. The connections between the various nodes of network elements 131–136 in NEL 130 define the in-service channels. For simplicity, the connections between the network elements are not shown in FIG. 1. Switching connections between the nodes in network elements 131–136 in NEL 130 reroutes the in-service channel, or provisions a new channel for communications service.

Each network element 131–136 in NEL 130 can be designed to provide status and connection information to the higher network management layers 110, 120. This status and connection information is used by the network hierarchy to plan and implement new network configurations. In particular, network elements 131–136 are connected to one of domain managers 121–123 in domain management layer (DML) 120. For example, FIG. 1 shows network elements 131 and 132 connected to domain manager 121. In this manner, each domain manager 121–123 controls a portion of NEL 130. In a preferred embodiment, each domain manager 121–123 has exclusive communication with particular network elements 131–136. A "domain" is the portion of NEL 130 that is "seen" by a particular domain manager 121–123. The domain of domain manager 121–123 may be defined by a vendor's equipment or the geographic location of the network equipment. For example, domain manager 121 can provide information to and retrieve information from network elements 131 and 132 in its domain. The information transfer may occur either periodically or upon a user's request.

NML 110 comprises network manager 111. Connection information to switch network elements 131–136 is provided to domain managers 121–123 by the network manager 111 in network manager layer (NML) 110. Additionally, network elements 131–136 provide status information describing the state of NEL 130 to NML 110 to enable effective network management. Network manager 111 is logically shown as a single entity. In implementation, network manager 111 may comprise one or more sites. For example, multiple service centers (not shown) can exist in different parts of the country (e.g., East Coast and West Coast). In combination, these national-level service centers provide total visibility of the physical network in NEL 130. In the preferred embodiment, network manager 111 interacts with NEL 130 through the DML 120. Information about the network is provided from NEL 130 to NML 110 and from NML 110 to NEL 130 through DML 120.

Network manager 111 can also be split among services and/or network elements. For example, in one embodiment, a first network manager is dedicated to asynchronous parts of the network, a second network manager is dedicated to DS1, DS3 and VT-n traffic, and a third network manager is dedicated to STS-n and OC-n traffic.

Network manager 111 can provide a user interface for the provisioning of various services. For example, a customer can indicate a desire for a DS1 digital data service between network element 131 and network element 135. Upon receipt of this customer request, network manager 111 determines the connection information corresponding to the desired provisioned channel. Additionally, network manager 111 may determine that the in-service channel must be rerouted because of equipment problems, bandwidth problems, to take advantage of new hardware in NEL 130, etc. Network manager 111 then communicates the connection information to domain managers 121–123 that control the part of the NEL 130 necessary to set up the DS1 connection between network elements 131 and 135.

Figure 2:
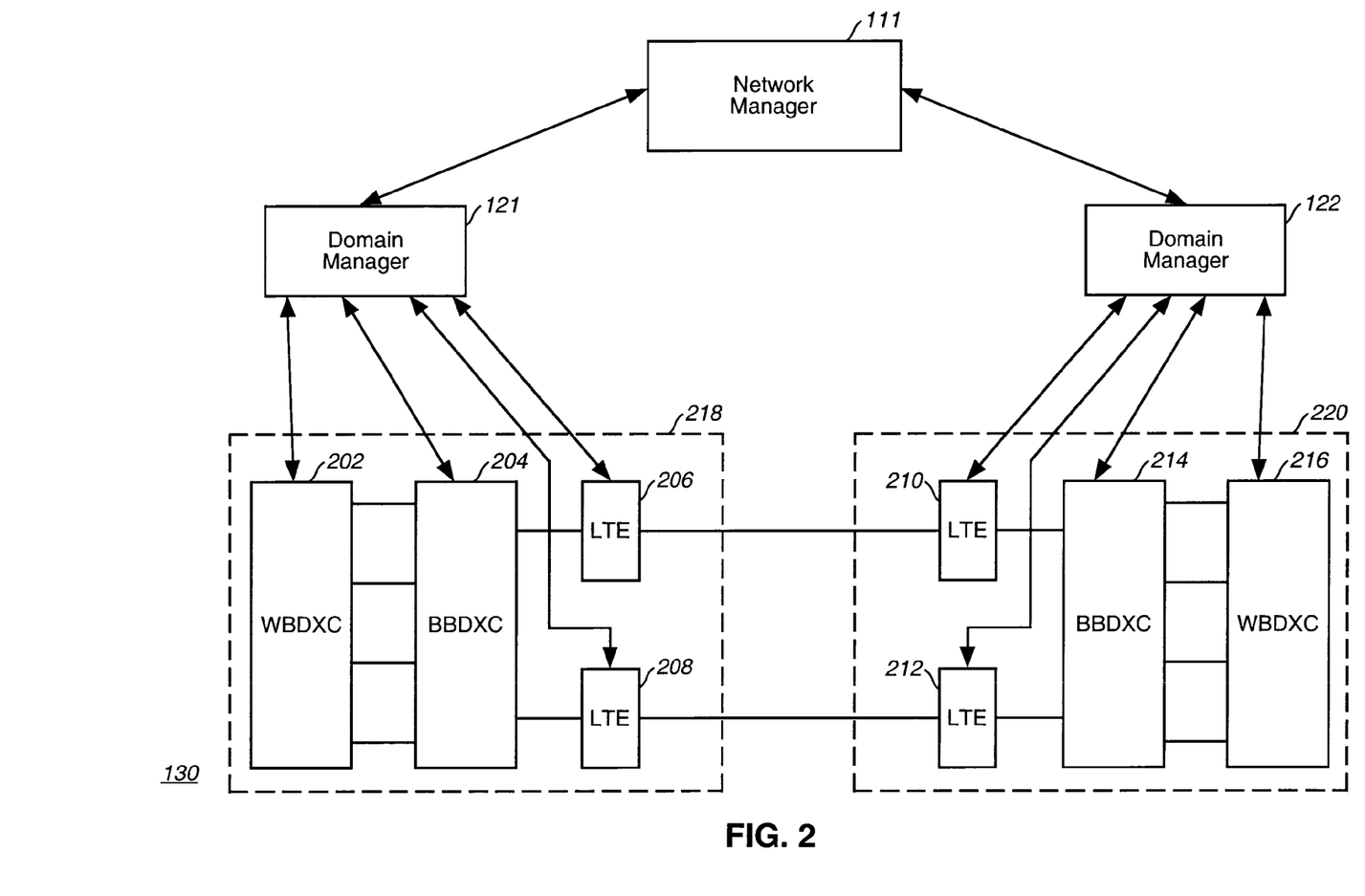
FIG. 2 illustrates a network management system with a detailed view of a network element layer.

FIG. 2 illustrates the network management system, and provides a more detailed view of an exemplary network element layer. The network element layer of FIG. 2 includes a plurality of network elements 202–216, and shows the network element interconnections that carry the network communication traffic. The network element layer of FIG. 2 includes: WBDXC 202, 216; BBDXC 204, 214; and LTEs 206–212. WBDXC 202, 216 multiplexes lower rate channels into and out of higher-rate channels for transmission to BBDXC 204, 214 or LTEs 206–212. For the purposes of explanation, all correspondingly identified elements are the same, and will be referred to by a single reference number. It should be understood, however, that the present invention is equally applicable to any network element capable of switching nodes and re-routing a communications channel.

Domains 218, 220 are represented by dotted boxes in FIG. 2. Domains 218, 220 are defined by those network elements that can be "seen" by a particular domain manager. In FIG. 2, for example, domain 218 is defined by network elements 202–208, which are seen by domain manager 121.

Figure 3:
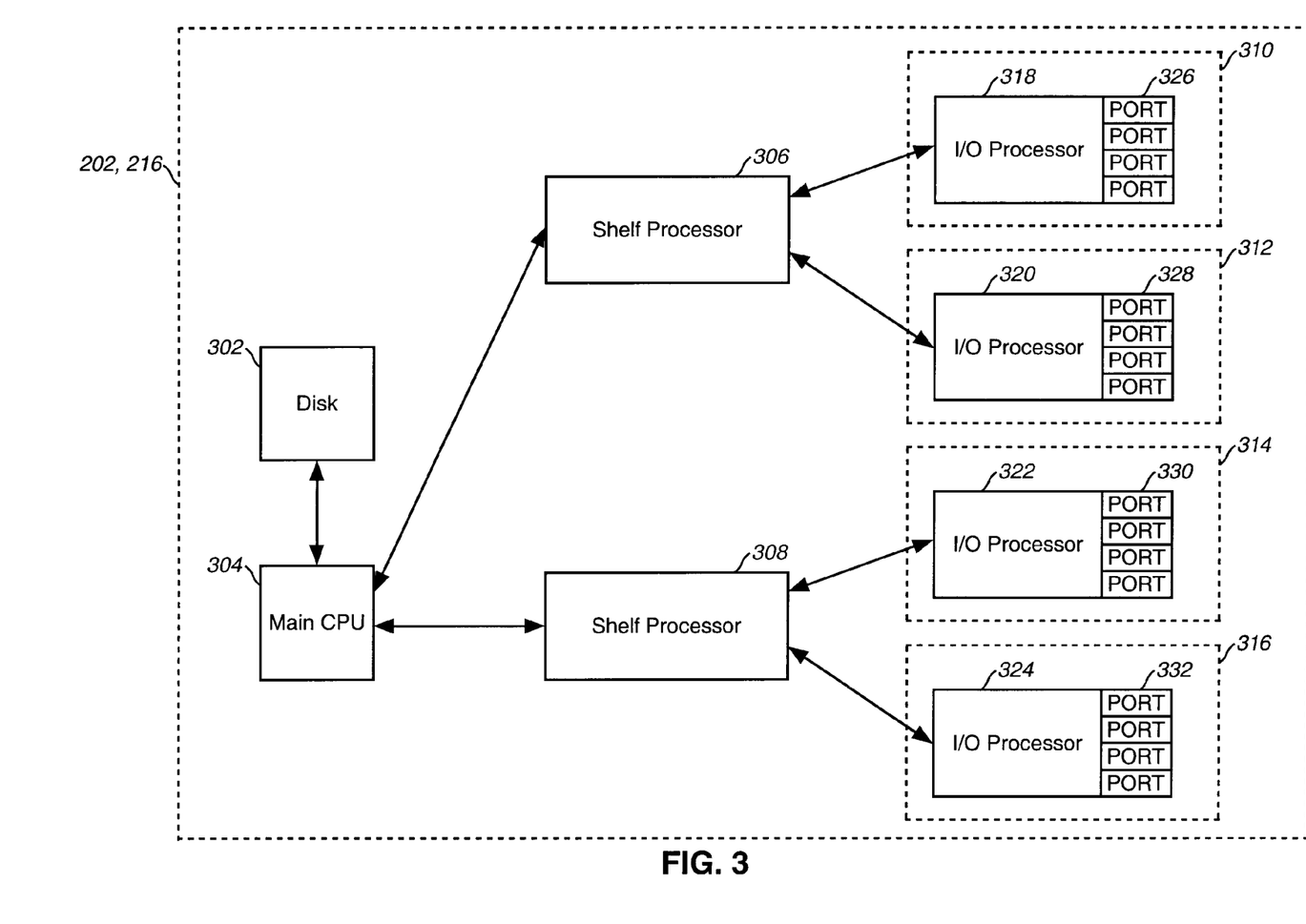
FIG. 3 illustrates the elements of a network element.

FIG. 3 further illustrates WBDXC 202. WBDXC 202 comprises: disk 302; main CPU 304; supervisor CPUs 306, 308; and I/O cards 310–316. I/O cards 310–316 further comprise I/O processors 318–324, and I/O ports 326–332. Disk 302 stores configuration information describing the configuration of and management and operating system software for WBDXC 202. Main CPU 304 accesses disk 302, controls shelf processors 306, 308, runs software and communicates with domain manager 121. Main CPU 304 also manages the high level operation of WBDXC 202. Some of the management functions of main CPU 304 are, for example, providing the user interface, keyboard interface, disk drive interface, tape drive interface, etc. Main CPU 304 also provides communication to the hierarchy of network management layers 110, 120 above.

Shelf processors 306, 308 supervise and control individual I/O cards 310–316 on a particular "shelf" of a WBDXC 202. A shelf comprises a plurality of I/O cards of the same type and configuration (e.g., 16 DS-3 I/O cards). Shelf processors 306, 308 provide shelf supervision, shelf performance monitoring, restore and remove functionality and control (i.e., removal and addition of shelf hardware) and equipment state changes. Shelf processors 306, 308 provide the interface between the I/O cards 310–316 on a particular shelf and the main CPU 304.

I/O cards 310–316 comprise I/O processors 318–324 and I/O ports 326–332. I/O cards 310–316 are supervised by a particular shelf processor 306, 308. I/O cards 310–316 on the same shelf have the same number of ports, and handle the same density channel (i.e., DS1, DS3, OC-12, etc.). I/O cards 310–316 receive connection and switching commands from shelf processors 306, 308. I/O cards 310–316 also provide port status information to shelf processor 306, 308. I/O processors 318–324 control the sending and receiving of the actual communication signals. Ports 326–332 are the communications ports to which the fiber or telecommunications lines are connected in WBDXC 202. Ports 326–332 may be DS1, DS3, VT1.5, etc. in density. Ports 326–332 are the nodes between which the connections are switched, and provide the signals that go out on the network cabling.

Figure 4:
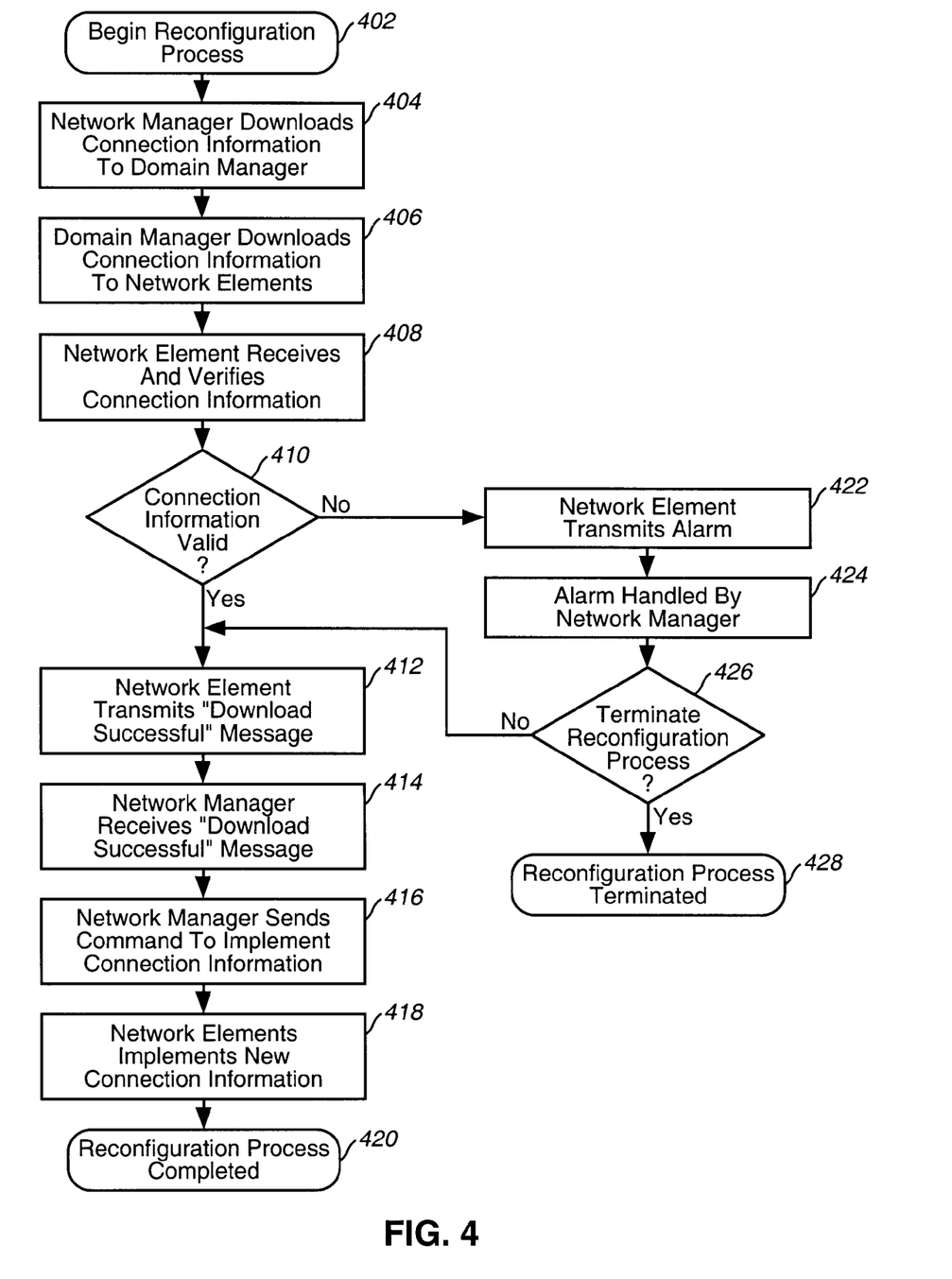
FIG. 4 is a flow diagram illustrating the message based process for network reconfiguration.

FIG. 4 is a flow chart which illustrates the process of message based network reconfiguration. The network reconfiguration process begins at step 402. After step 402, network manager 111 downloads the connection information to domain manager 121 at step 404. In the preferred embodiment, the network is reconfigured one domain at a time. Reconfiguring multiple domains at the same time may cause excessive in-service channel drop out due to the time lag between when the network elements of different domains switch their connections. Assume, for example, a domain in New York and a domain in California are part of the same in-service channel to be reconfigured by a network manager in New York. After the network elements are reconfigured, the network manager broadcasts a message to implement the new connection information. Because of the distance between New York and California, the network elements in New York would necessarily implement the new connection information much sooner than the network elements in California. Since a new in-service channel is not re-established until the new configuration is implemented, the time lag between the New York and California domains causes a longer drop out in the in-service channel. To minimize in-service channel downtime, the network is reconfigured one domain at a time. In situations where the lag time is not unacceptably long, however, more than one domain may be reconfigured at a time.

The connection information that is downloaded to the network elements defines the desired configuration of the network, and can either describe the desired configuration of the total network (i.e., all of the connections in the network), or a list of the changes to be made to the current network configuration (i.e., a "delta" file). The connection information can be in the form of a network map of the connections between the network elements, a series of TL-1 commands that switch the network element connection, or a database of connection information.

Domain manager 121 downloads connection information at step 406 to those network elements that will be reconfigured after network manager 111 has downloaded the connection information at step 404. Domain manager 121 downloads only that connection information to each network element to which it applies. Alternatively, domain manager 121 may download all of the domain connection information network elements 202–208, and each network element implements only that connection information which applies to it.

WBDXC 202 verifies the connection information at step 408 after it has received the connection information from domain manager 121. WBDXC 202 verifies that the ports and port IDs specified by the connection information exist, that the hardware exists to support the proposed connections, that the ports specified by the connection information are in the correct state, that the connection information has the correct syntax, that the connection information is not corrupted, etc. If the connection information is successfully verified in step 408, the connection information is determined to be valid at step 410. If the connection information is not successfully verified in step 408, the connection information is determined to be invalid at step 410. In the case of a WBDXC 202 the verification and validation steps are performed by main CPU 304.

After WBDXC 202 has determined that the connection information is invalid at step 410, WBDXC 202 transmits an alarm at step 422. The alarm is transmitted to domain manager 121 which manages the domain of the WBDXC 202. Domain manager 121 then relays the alarm to network manager 111, and the alarm is handled by network manager 111 at step 424.

After network manager 111 receives an alarm from WBDXC 202, network manager 111 takes steps to handle it at step 424. Network manager 111 may handle an alarm in different ways. If network manager 111 receives only a few network element alarms in response to downloaded connection information, network manager 111 may download supplementary connection information to bypass those connections which caused network element alarms. The supplementary connection information would be downloaded to domain manager 121 and WBDXC 202, causing WBDXC 202 to bypass those connections that caused the alarms.

Alternatively, if network manager 111 receives a large number of network element alarms, it may broadcast commands to roll back all the downloaded connection information, thereby restoring the network to its previous configuration. Commands to remove the downloaded connection information are sent to domain manager 121 and then downloaded to the affected network elements to restore the previous network configuration. The decision whether to terminate the reconfiguration process or to continue the reconfiguration process is made at step 426. If network manager 111 determines that the reconfiguration process can proceed, then the reconfiguration process continues at step 412. If, on the other hand, network manager 111 determines that the reconfiguration process cannot proceed, the reconfiguration process is terminated at step 428.

After the connection information has been determined to be valid at step 410, WBDXC 202 transmits a "download successful" message at step 412. The download successful message indicates that the connection information has been verified and the connection information is ready to be implemented at WBDXC 202. The download successful message is transmitted from WBDXC 202 to domain manager 121. Domain manager 121 then either transmits each download successful message it receives from the network elements in its domain 218 to network manager 111, or consolidates all of the download successful messages into a single download successful message and transmits it to network manager 111.

After network manager 111 receives the download successful message at step 414, network manager 111 verifies that a download successful message has been received from all the network elements that received connection information. Alternatively, this verification can be done at the domain manager level. After all necessary download successful messages have been received from the network elements, network manager 111 broadcasts a command to implement the new connection information at step 416. The command to implement the new connection information is transmitted through domain manager 121 and distributed to the network elements that will be switching connections. The new connection information is implemented by switching the connections at the network elements that receive the command to implement the connection information. All of the network elements, therefore, are switched substantially simultaneously and the old in-service channel is removed and the new in-service channel is created.

Switching all of network elements involved in reconfiguring the network at the same time results in only one interruption of the in-service channel. This allows the network to be reconfigured without the need for additional capacity and solves most of the problems with the patch and roll process. The WBDXC 202 implements the new connection information at step 418, as soon as it receives the command to implement the new connection information. The implementation of the new connection information comprises breaking the old connections and making the new connections substantially simultaneously, so that a new in-service channel is created and the old one is destroyed. This results in the creation of a new in-service channel while interrupting the in-service channel only one time. After WBDXC 202 has implemented the new connection information at step 418, the reconfiguration process is completed at step 420.

Figure 5:
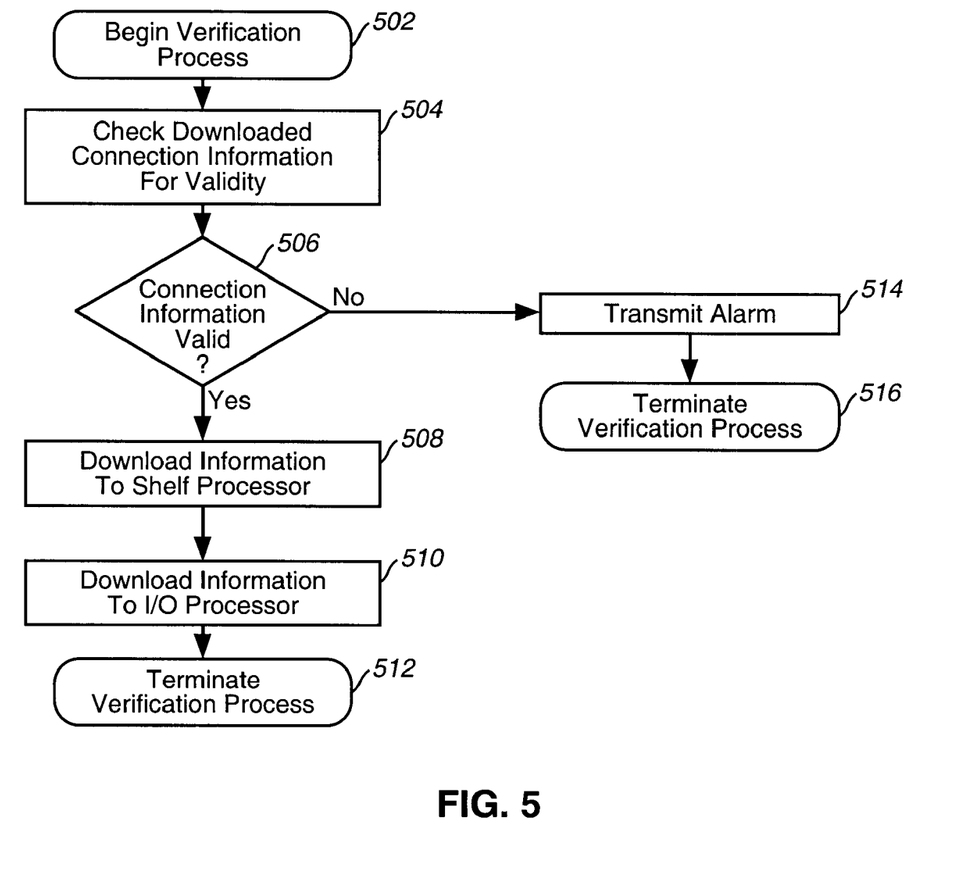
FIG. 5 is a flow diagram illustrating the connection information verification process.

FIG. 5 further illustrates the verification process of step 408. The verification process is performed at WBDXC 202 and begins at step 502. The connection information is downloaded from domain manager 121 and copied onto disk 302 or RAM associated with main CPU 304. The downloaded connection information does not replace the current configuration (i.e., the network element configuration information is maintained) on WBDXC 202. The current configuration information on the network element is maintained so that if the downloaded connection information is rolled back due to a verification problem, the current network element configuration is preserved.

At step 504, main CPU 304 checks the validity of the connection information for syntax correctness, verifies the port number on WBDXC 202 is in the correct state, that the port number is valid, and other tests which ensure that the new connection information can be implemented. If the connection information is determined to be valid at step 506, the verification process continues to step 508.

If, on the other hand, the connection information is determined to be invalid, WBDXC 202 transmits an alarm at step 514. The verification process is then terminated at step 516 after the alarm has been transmitted at step 514. After the termination of the verification process, the reconfiguration process continues at step 424.

If the connection information has been determined to be valid at step 506, the connection information is downloaded from main CPU 304 to shelf processors 306, 308. The main CPU 304 can either download only that connection information which pertains to a particular shelf processor, or download all of the connection information received from domain manager 121.

Shelf processor 306 then download the appropriate connection information to I/O processors 318–324 at step 510. After the connection information has been downloaded to I/O processors 318–324, the verification process terminates at step 512. After the termination of the verification process, the reconfiguration process continues at step 410.

While the invention has been particularly shown and described with reference to preferred embodiments thereof, it will be understood by those skilled in the relevant art that various changes in form and details may be made therein without departing from the spirit and scope of the invention.

What is claimed is:

1. A method for reconfiguring a network wherein said network comprises a plurality of network elements which further comprise a plurality of network connections, said method comprising the steps of:

(1) identifying a new configuration for said network;
   (2) identifying new connection information associated with said new configuration;
   (3) downloading said new connection information to said plurality of network elements;
   (4) broadcasting a message to said plurality of network elements; and
   (5) activating said downloaded new connection information stored by said plurality of network elements substantially simultaneously in response to said broadcast message.

2. The method of claim 1, further comprising the step of verifying the validity of said new connection information.

3. The method of claim 2, further comprising the step of transmitting an alarm if said step of verifying determines said new connection information is invalid.

4. The method of claim 1, further comprising the step of transmitting a download successful message in response to said step of downloading.

5. The method of claim 1, wherein said step of activating further comprises the step of switching the network connections of said plurality of network elements.

6. A system for reconfiguring a network wherein said network comprises a plurality of network elements which further comprise a plurality of network connections, said system comprising:

(1) means for identifying a new configuration for said network;
   (2) means for identifying new connection information associated with said new configuration;
   (3) means for downloading said new connection information to said plurality of network elements;
   (4) means for broadcasting a message to said plurality of network elements; and
   (5) means for activating said downloaded new connection information stored by said plurality of network elements substantially simultaneously in response to said broadcast message.

7. The system of claim 6, further comprising means for verifying the validity of said new connection information.

8. The system of claim 7, further comprising means for transmitting an alarm if said step of verifying determines said new connection information is invalid.

9. The system of claim 6, further comprising means for transmitting a download successful message in response to said step of downloading.

10. The system of claim 6, wherein said means for activating further comprises the means for switching the network connections of said plurality of network elements.

11. A method for reconfiguring a network element in a network wherein the network comprises a plurality of network elements which further comprise a plurality of network connections, the method comprising:

receiving new connection information, wherein the new connection information defines new connections for the network element and is associated with a new configuration for the plurality of network elements;
   storing the new connection information in a memory;
   receiving a broadcast message, wherein the broadcast message contains a command to activate the new connection information for the network element; and
   making new connections to the network element as defined by the new connection information in response to the command to activate the new connection information.

12. The method of claim 11, further comprises verifying the validity of the new connection information.

13. The method of claim 12, further comprises transmitting an alarm if the step of verifying determines that the new connection information is invalid.

14. The method of claim 11, further comprises transmitting a download successful message in response to the step of downloading.

15. The method of claim 11, wherein making new connections to the network element further comprises breaking old connections to the network element in conjunction with making new connections to the network element.

16. The method of claim 11, wherein the network element is a first network element, the new connection information is a first new connection information in the network, the memory is a first memory and the broadcast message is a first broadcast message, the method further comprises:

receiving second new connection information, wherein the second new connection information defines new connections for the second network element and is associated with the new configurational for the plurality of network elements;
   storing the second new connection information in a second memory;
   receiving a second broadcast message, wherein the second broadcast message has been broadcast in conjunction with the first broadcast message and contains a command to activate the second new connection information for the second network element; and
   making new connections to the second network element as defined by the second new connection information in response to the command to activate the second new connection information.

* * * * *